(12) United States Patent
Ramic et al.

(10) Patent No.: US 8,412,662 B2
(45) Date of Patent: Apr. 2, 2013

(54) METHOD AND SYSTEM OF INTERACTION WITHIN BOTH REAL AND VIRTUAL WORLDS

(75) Inventors: Haris Ramic, Chicago, IL (US); Thomas M. Tirpak, Glenview, IL (US)

(73) Assignee: Motorola Mobility LLC, Libertyville, IL (US)

( * ) Notice: Subject to any disclaimer, the term of this patent is extended or adjusted under 35 U.S.C. 154(b) by 500 days.

(21) Appl. No.: 12/478,140

(22) Filed: Jun. 4, 2009

(65) Prior Publication Data

US 2010/0312739 A1    Dec. 9, 2010

(51) Int. Cl.
G06F 17/00 (2006.01)
G06N 5/02 (2006.01)

(52) U.S. Cl. ......................................................... 706/47
(58) Field of Classification Search ................... 706/12, 706/47
See application file for complete search history.

(56) References Cited

U.S. PATENT DOCUMENTS

| | | | |
|---|---|---|---|
| 6,073,489 A | 6/2000 | French et al. | |
| 6,377,263 B1 | 4/2002 | Falacara et al. | |
| 6,749,432 B2 | 6/2004 | French et al. | |
| 6,768,982 B1 * | 7/2004 | Collins et al. | 706/45 |
| 6,772,121 B1 | 8/2004 | Kaneko | |
| 6,842,877 B2 | 1/2005 | Robarts et al. | |
| 7,171,334 B2 | 1/2007 | Gassner | |
| 7,248,171 B2 | 7/2007 | Mishelevich | |
| 2001/0040575 A1 | 11/2001 | Haga et al. | |
| 2003/0154090 A1 | 8/2003 | Bernstein et al. | |
| 2004/0175680 A1 | 9/2004 | Hlavac et al. | |
| 2005/0026765 A1 | 2/2005 | Escal | |
| 2005/0054381 A1 | 3/2005 | Lee et al. | |
| 2007/0111795 A1 | 5/2007 | Choi et al. | |
| 2007/0143679 A1 | 6/2007 | Resner | |
| 2008/0027673 A1 | 1/2008 | Trumm | |
| 2008/0070689 A1 * | 3/2008 | Van Luchene et al. | 463/42 |
| 2009/0240647 A1 * | 9/2009 | Green et al. | 706/52 |
| 2010/0046806 A1 * | 2/2010 | Baughman et al. | 382/115 |
| 2010/0145890 A1 * | 6/2010 | Donovan et al. | 706/10 |

FOREIGN PATENT DOCUMENTS

WO    9714102    4/1997

OTHER PUBLICATIONS

Moore, Tyrone, Great Britain, Combined Search and Examination Report under Sections 17 & 18(3) Oct. 14, 2010, all pages.
Oudeyer, Pierre-Yves et al.: "Intrinsic Motivation Systems for Autonomous Mental Development", (2007), IEEE Transactions on Evolutionary Computation, 11(2), DOI: 10.1109/TEVC 2006 890271, IEEE Transactions on Evolutionary Computation, pp. 1-22.

(Continued)

*Primary Examiner* — Kakali Chaki
*Assistant Examiner* — Ababacar Seck
(74) *Attorney, Agent, or Firm* — Stephen H. Shaw

(57) ABSTRACT

A method and system for controlling the activities of real and virtual entities by monitoring and analyzing a real entity's activities and providing responses to affect virtual and real behavior patterns, according to pre-established rules. A Real-time Monitoring and Virtualization (RMV) utility collects information about the real entity's behavior utilizing monitors. The RMV utility creates a model of the behavior of the real entity. The RMV utility utilizes the created model and maps one or more first characteristics of the behavior of the real entity to one or more second characteristics of a behavior of a virtual entity. From the monitored and mapped characteristics, the RMV utility identifies desired behavior patterns (i.e., responses) for the virtual entity, according to pre-established rules. The RMV utility triggers actions of the real entity corresponding to the responses selected for the desired behavior patterns of the virtual entity.

19 Claims, 9 Drawing Sheets

OTHER PUBLICATIONS von Jascha Russeler: "Implicit and Explicit Learning of Event Sequences: An Analysis with Event-Related Brain Potentials", Dissertation zur Erlangung des Doktorgrades der Naturwissenschaften, dem Fachbereich Psychologie, der Philipps-Universitat Marburg vorgelegt, Marburg/Lahn, 1999, pp. 1-166.

Westeyn, Tracy et al.: "Recognizing Mimicked Autistic Self-Stimulatory Behaviors Using HMMs", College of Computing and GVU Center; Georgia Institute of Technology, Atlanta, GA 30332-0280 USA, http://www.cc.gatech.edu/~turtle/my_papers/weseyn_ISWC2005.pdf, 2005, all pages.

* cited by examiner

METHOD AND SYSTEM OF INTERACTION WITHIN BOTH REAL AND VIRTUAL WORLDS

BACKGROUND

1. Technical Field

The present invention generally relates to data processing systems applications and in particular to data processing system applications that enable interactions/mappings between real entities and virtual entities.

2. Description of the Related Art

With an ever increasing demand for more sophisticated levels of interaction between persons in remotely connected locations, computerized mechanisms that employ virtual entities and virtual zones to represent those involved in this type of interaction are becoming an increasingly popular tool. As an example, the use of virtual entities and virtual zones may enable the interaction between a pet owner and his virtual pet dog.

As virtual worlds become more widely deployed and adopted, there is the need to coordinate experiences in the virtual world with a variety of experiences in the real world. Pet care is one such example of an experience that can span both real and virtual worlds. However, current systems do not provide "seamlessly integrated real-virtual world experiences."

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
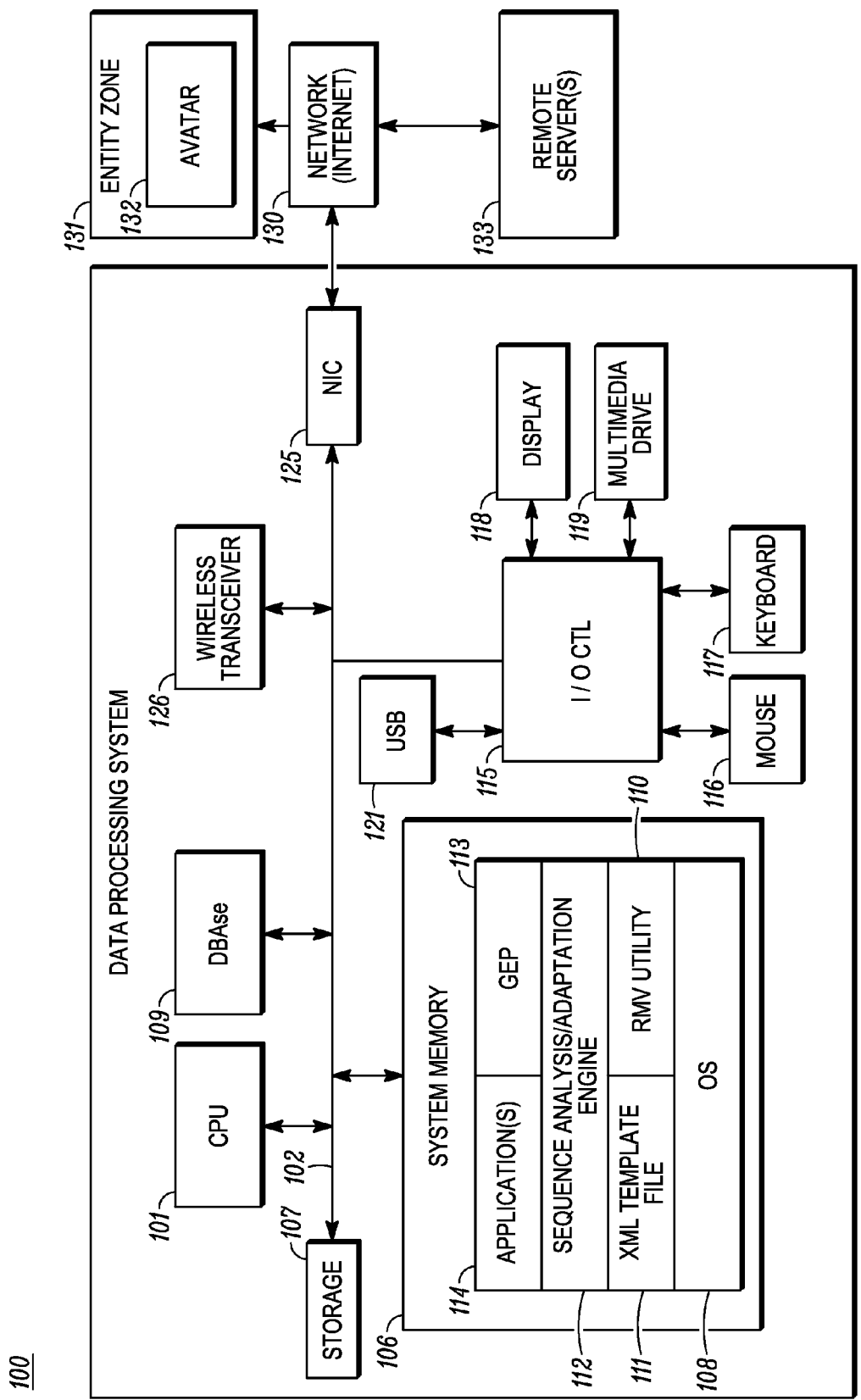
FIG. 1 provides a block diagram representation of an example data processing system within which the invention may be practiced, according to one embodiment.

The illustrative embodiments provide a method and system for controlling the activities of real and virtual entities by monitoring and analyzing a real entity's activities and providing responses to affect virtual and real behavior patterns, according to pre-established rules. A Real-time Monitoring and Virtualization (RMV) utility collects information about the real entity's behavior utilizing one of the available monitoring mechanisms. The RMV utility creates a model of the behavior of the real entity. The RMV utility utilizes the created model and maps one or more first characteristics of the behavior of the real entity to one or more second characteristics of a behavior of a virtual entity. From the monitored and mapped characteristics, the RMV utility identifies desired behavior patterns (i.e., responses) for the virtual entity, according to pre-established rules. The RMV utility triggers actions of the real entity corresponding to the responses selected for the desired behavior patterns of the virtual entity.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 101 connected to system memory 106 via system interconnect/bus 102. Also connected to system bus 102 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. DPS 100 also includes wireless transceiver device 126 to enable communication with wirelessly connected devices. DPS 100 also comprises storage 107, within/from which data/instructions/code may also be stored/retrieved. Database 109 is also connected to system bus 102.

DPS 100 is also able to communicate with one or more entity zones, of which, virtual entity zone 131 is specifically referenced and illustrated. Illustrated within virtual entity zone 131 is a 'virtual entity'/'avatar' which is referenced by avatar 132. Virtual entity zone 131 and avatar 132 are further illustrated and described in FIG. 3.

DPS 100 is also illustrated with wireless transceiver 126, which may receive and transit signals from/to monitors and receivers located in an environment that is within a wireless range of wireless transceiver 126. To further enable external network connection, DPS 100 also includes network interface component (NIC) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NIC 125 may be configured to operate via wired or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 133, which may also provide data/instructions/code for execution on DPS 100, in one embodiment.

In addition to the above described hardware components of wireless system 100, various features of the invention are completed/supported via software (or firmware) code or logic stored within memory 106 or other storage and executed by processor 101. Thus, for example, illustrated within memory 106 are a number of software/firmware/logic components, including operating system (OS) 108, entity virtualization application 114, Extensible Markup Language (XML) application 111 and a Machine Learning and/or Incremental Learning application, for example, Gene Expression Programming (GEP) application 113. In addition, memory 106 comprises sequence analysis/adaptation engine 112 and Remote Monitoring and Virtualization (RMV) logic/utility 110. In actual implementation, RMV logic 110 may be combined with sequence analysis/adaptation engine 112 to provide a single executable component, collectively providing the various functions of each individual component when the corresponding combined component is executed on the processor. For simplicity, RMV logic 110 is illustrated and described as a stand alone or separate logic/firmware component, which provides specific functions, as described below.

In one embodiment, server 133 represents a software deploying server, and DPS 100 communicates with the software deploying server (133) via network (e.g., Internet 130) using network interface component 125. Then, RMV utility 110 may be deployed from/on the network, via software deploying server 133. With this configuration, software deploying server performs all of the functions associated with the execution of RMV utility 110. Accordingly, DPS 100 is not required to utilize internal computing resources of DPS 100 to execute RMV utility 110.

Certain of the functions supported and/or provided by RMV utility/logic 110 are implemented as processing logic (or code) executed by DSP/processor 101 and/or other device hardware, which processing logic completes the implementation of those function(s). Among the software code/instructions/logic provided by RMV logic 110, and which are specific to the invention, are: (a) logic for collecting information about the behavior pattern of a real entity via one or more monitoring and communications device; (b) logic for creating a model of the behavior of the real entity based on the information collected; (c) logic for using the created model to map one or more first characteristics of the behavior of the real entity to one or more second characteristics of a behavior of a virtual entity, according to a pre-defined set of rules, relations and conditions; and (d) logic for selecting the optimal response/action to the behavior pattern of the real entity based on the mapped first and second characteristics. According to the illustrative embodiment, when processor 101 executes RMV logic 110, DPS 100 initiates a series of functional processes that enable the above functional features as well as additional features/functionality. These features/functionalities are described in greater detail below within the description of FIGS. 2-8.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Figure 2:
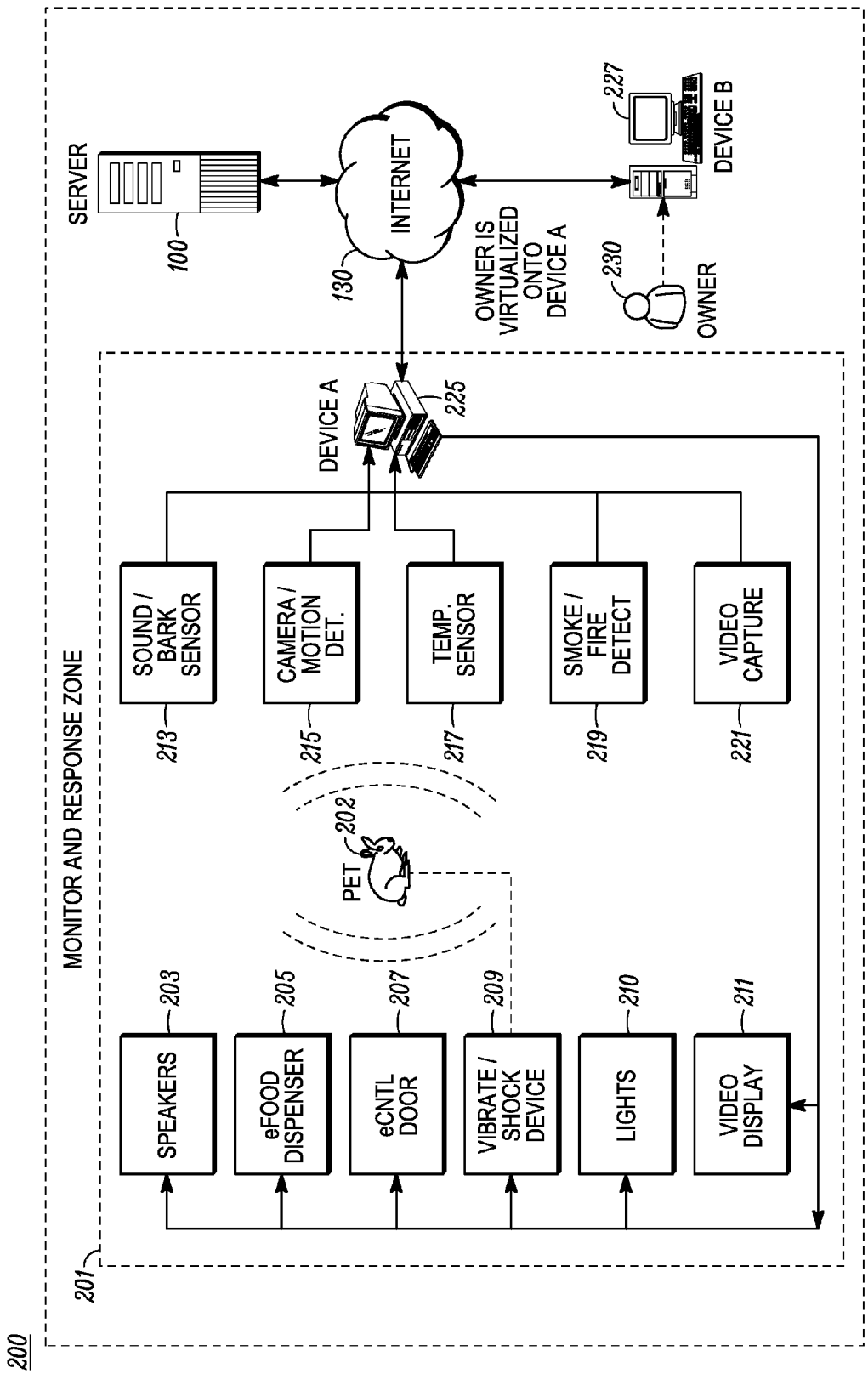
FIG. 2 illustrates example monitoring and response triggering devices in a virtualization environment, according to one embodiment.

With reference now to FIG. 2, a virtualization environment is illustrated, according to one embodiment. Virtualization environment 200 comprises monitor and response zone 201 which is connected to Interpret Server 100 via Internet 130. Virtualization environment 200 also comprises data processing/communicating device B 227 which allows owner 230 to connect to Interpret server 100 and/or to monitor and response zone 201. Monitor and response zone 201 comprises a monitored real entity, e.g., pet 202. Monitor and response zone 201 is equipped/fitted with a collection of sensor and activity monitoring devices that may be placed at various locations, including audio/sound/bark sensor 213, camera and motion detector 215, temperature sensor 217, smoke/fire detector 219 and video capture device 221. This collection of sensor and activity monitoring devices are also collectively referred to as a monitoring device(s). Monitor and response zone 201 is also equipped/fitted with a collection of response devices, including speaker(s) 203, electronic food dispenser 205 and electronically controlled smart door 207. Other responsive devices include pet vibration/shock device 209, alert lights 210 and video display device 211. In addition, monitor and response zone 201 comprises data processing device A 225. Device A 225 is connected to the monitoring devices and also to the response devices. In addition, RMV utility 110 may present a virtual representation of owner 230 to pet 202 via device A 225.

A monitoring device senses the actions/activities of pet 202 as pet 202 performs actions and moves about monitor and response zone 201. The monitoring device(s) records information about characteristics of pet 202 and the corresponding environment of pet 202. The monitoring device is placed at one or more of: (a) a location at which the monitoring device is attached to pet 202; and (b) a fixed location within the surrounding environment of pet 202. The monitoring device identifies (a) an occurrence of one or more of a pre-specified set of events by using a pre-defined set of thresholds, e.g., a particular sound level from a barking dog to trigger a particular response; and (b) an existence of one or more of a pre-specified set of conditions and/or sequence of events by using a pre-defined set of event rules.

The monitoring device sends information about the identified events (i.e., the occurrence of particular action(s)) and conditions to an event sequence analysis and adaptation engine represented by RMV utility 110/Interpret Server 100 in order to determine an appropriate response by the responding entity. RMV utility 110 examines the pet's actions, a set of rules and relations information in order to provide the appropriate response to the pet's action. The rules and relations guidelines/information are pre-determined by owner 230 who may also interact with pet 202 via a virtual persona/avatar of owner 230. The detection of sensor signals, processing of sensor signals, the selection of appropriate responses and the execution of responses are further described with the aid of virtualization environment 300 shown in FIG. 3.

Figure 3:
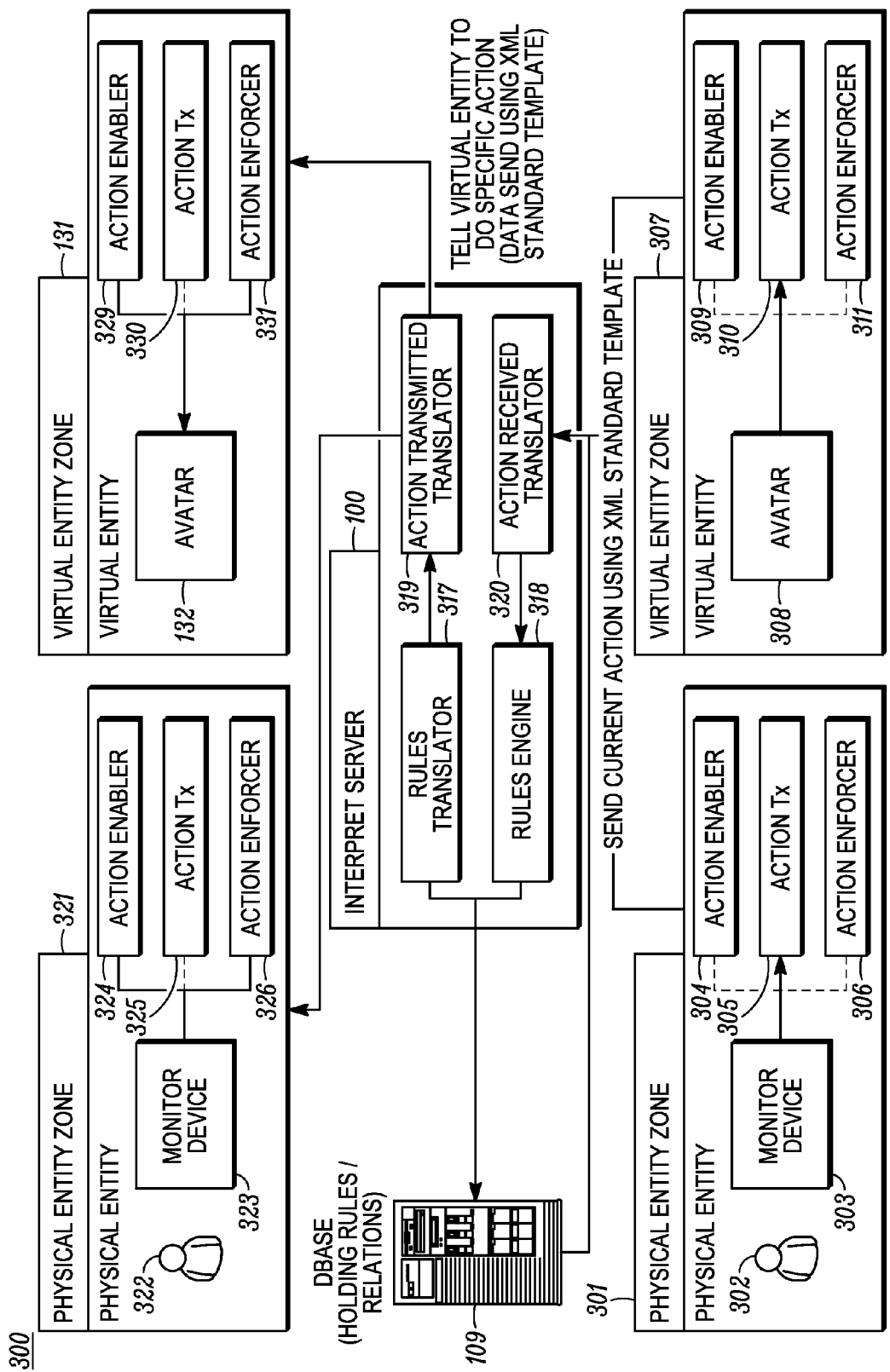
FIG. 3 illustrates a virtualization environment, according to one embodiment.

FIG. 3 is a second illustration of a virtualization environment, according to one embodiment. In the illustrated embodiment, two real/physical entities (302 and 322) and two virtual entities/avatars (308 and 132) are provided within respective physical entity zones (301 and 321) and virtual entity zones (307 and 131). The illustration provides an example of one possible interconnection, via interpret server 100, between multiple physical entities and virtual entities, and other embodiments may include less than or more than two physical entities and two virtual entities. One or more of the physical entities or the virtual entities may provide actions that are coded and transmitted to the interpret server 100, where those actions produce specific responses that may be sent to modify the behavior or characteristics of any one of the physical entities or the virtual entities, including the entity which generated the original action. In the illustration provided, actions of the bottom most physical entity (302) and/or virtual entity/avatar 308 are forwarded to interpret sever 100 to affect a response at one or more of physical entity 322 or virtual entity/avatar 132. However, as provided by the descriptions herein (and particularly with respect to FIG. 4), the actions of an entity (e.g., physical entity 302) may also be analyzed to generate responses targeting the same entity (physical entity 302).

Referring specifically to FIG. 3, virtualization environment 300 comprises physical entity zone 301. Virtualization environment 300 also comprises virtual entity zone 307. In addition, virtualization environment 300 comprises Interpret Server 100 which is connected to database 109. Physical entity zone 301 further comprises real entity/pet 202 and monitoring device 303. Monitoring device 303 is respectively connected to action enabler 304, action transmitter 305 and action enforcer 306. Virtual entity zone 307 further comprises avatar 308. Avatar 308 is respectively connected to action enabler 309, action transmitter 310 and action enforcer 311. Virtual entity zone 307 may be a computerized representation of a pet owner while physical entity zone 301 may comprise an actual pet, corresponding monitoring devices (e.g., device monitor 303 which may include audio/sound/bark sensor 213, camera and motion detector 215 and video capture device 221) and corresponding data signal transmitter/receiver devices/mechanisms (e.g., action enabler 309, action transmitter 310 and action enforcer 311). In virtualization environment 300, physical entity 302 and avatar/virtual entity 308 are respectively described as performing/transmitting an initial action. However, physical entity 322 and virtual entity/avatar 132 are described as one or more of: (1) monitoring/detecting the transmitted initial action; and (2) receiving the instructions to provide a responding action. The responding action may be provided by response devices, e.g., speaker(s) 203, electronic food dispenser 205, electronically controlled smart door 207 and/or video display device 211. Thus, a first entity's behavior (physical entity 202 or avatar/virtual entity 308) is used to affect the behavior of multiple entities (physical entity 322 and avatar/virtual entity 132). Virtualization environment 300 is described as a snapshot of (a) actions by a first group of entities and (b) detection of actions and/or reception of instructions to provide a response by a second group of entities. However, RMV utility 110 may allow any entity or group of entities to perform actions and any other entity or group of entities to receive instructions to provide a response. The grouping of entities (e.g., first entity/group or second entity/group) is used only for illustrative convenience to indicate the entities that are currently exhibiting a particular behavior type (e.g., performing actions or receiving instructions to respond to actions). Thus, RMV utility 110 may provide any entity with the ability to perform actions, to receive instructions to provide a response and to provide responding actions. However, for convenience, further reference to the entities and components of virtualization environment 300 are provided while maintaining the behavior/action perspective consistent with virtualization environment 300.

Interpret Server 100 represents both an event sequence analyzer and an adaptation engine. In particular, interpret server 100 comprises rules translator 317 and rules engine 318. Interpret server 100 further comprises action transmitted translator 319 and action received translator 320.

Monitoring device(s) 303, which may represent a collection of one or more devices, tracks the activities of physical entity 302 (e.g., pet 202 of FIG. 2). When Monitoring device (s) 303 detects that one or more pre-defined actions are performed by physical entity 302, monitoring device 303 records the occurrence of the pre-defined action(s) and sends the occurrence of the action to action transmitter 305.

Action transmitter 305 compiles an XML file that includes information pertaining to the detected action(s). For example, XML standard template may include the sections outlined in the example XML template code, which is provided as follows:

```
<user information>
</user information>
<action information>
</action information>
<occurrence information>
</occurrence information>
<statistical information>
</statistical information>
<meta actions>
</meta actions>
<training information>
</training information>
```

Action transmitter 305 forwards an XML file to interpret server 100 and, in particular, to action received translator 320. RMV utility 110 detects receipt of the XML file when the XML file is received by action received translator 320. Action received translator 320 retrieves from the XML file the action data and corresponding identification (ID) of the entity (i.e., ID of physical entity 302). In addition, action received translator 320 obtains further data corresponding to physical entity 302, from database 109. For example, action received translator 320 may obtain historical actions/events data and statistical data from database 109. Action translator 320 forwards data corresponding to physical entity 302 to rules engine 318. In addition, rules engine 318 obtains rules and relations data corresponding to physical entity 302, from database 109 (via action received translator 320).

Rules engine 318 examines the rules and relation data to determine which set of rules to apply to the current behavior pattern (i.e., behavior pattern of physical entity 302 based on actions that may include past, present and likely future actions). The rules data include one or more of: (a) a pre-specified set of local action rules and identified conditions; and (b) a pre-specified set of global action rules and identified events and conditions. The local action rules refer to rules regarding direct actions by the monitored entity and/or responses resulting from these direct actions. The global action rules refer to rules regarding the conditions within the surrounding environment of the monitored entity and/or responses resulting from the conditions within the surrounding environment.

Rules engine 318 creates behavior models that represent a pre-determined level of statistical correlation between a set of events and conditions by using causal analysis techniques. Rules engine 318 uses machine learning and incremental learning techniques to develop these behavior models. Rules engine 318 uses these behavior models to predict probable future behavior patterns. Rules engine 318 creates the model of the first behavior pattern of the first entity. Rules engine 318 maps by using the model created one or more first characteristics of the first behavior pattern of the first entity to one or more second characteristics of a second behavior pattern of a second entity that exists in a virtual world.

Rules engine 318 forwards the entity ID and the selected rules and relations to rules translator 317. Rules translator 317 determines the potential set of responding actions (i.e., the potential response by virtual entity/avatar 132) based on the mapped characteristics of the entities involved, the selected rules and statistical information, representative of the behavior models in the rules engine 318. Virtual entity/avatar 132 may be developed to allow a user to upload recorded events into a virtual persona based on virtual world rules, in order to establish a more realistic representation of a real life subject via data processing system 100.

Rules translator 317 sends the potential set of responding actions and the user ID of virtual entity zone 131 to action transmitted translator 319. Action transmitted translator 319 selects the best action(s) and creates XML template/file 111 for virtual entity/avatar 132 based on the rules and the location of the virtual entity.

Action transmitted translator 319 determines one or more of: (a) a local response, according to a pre-specified set of local action rules and identified conditions; and (b) a global response, according to a pre-specified set of global action rules and identified events and conditions. The local response provides interaction directly with the first entity. For example, an electric shock emitted via a dog's collar to control the dog's behavior is a local response. On the other hand, the global response provides interaction directly with the surrounding environment. For example, the opening of an electrically controlled door to allow a pet to escape a room because of the detection of a high level of smoke is a global response.

Action transmitted translator 319 sends XML template/file 111 which includes the action information to action enforcer 331. Action enforcer 331 translates XML template file 111 to receive indication of the action to be performed. Action enforcer 331 forwards information of the selected action to action enabler 329. Action enabler 329 sends a request to perform the selected action to virtual entity/avatar 132. Virtual entity/avatar 132 performs the selected action.

In one embodiment, RMV utility 110 may develop a virtual entity representation of physical entity 302 based on the created behavior model. Similarly, RMV utility 110 may create virtual entity/avatar 308 from a previously developed set of behavior models for a corresponding physical entity in the real world. The process of developing a virtual entity by using information about the characteristics of a real entity is further described using the flow chart of FIG. 8, described later herein.

Figure 4A:
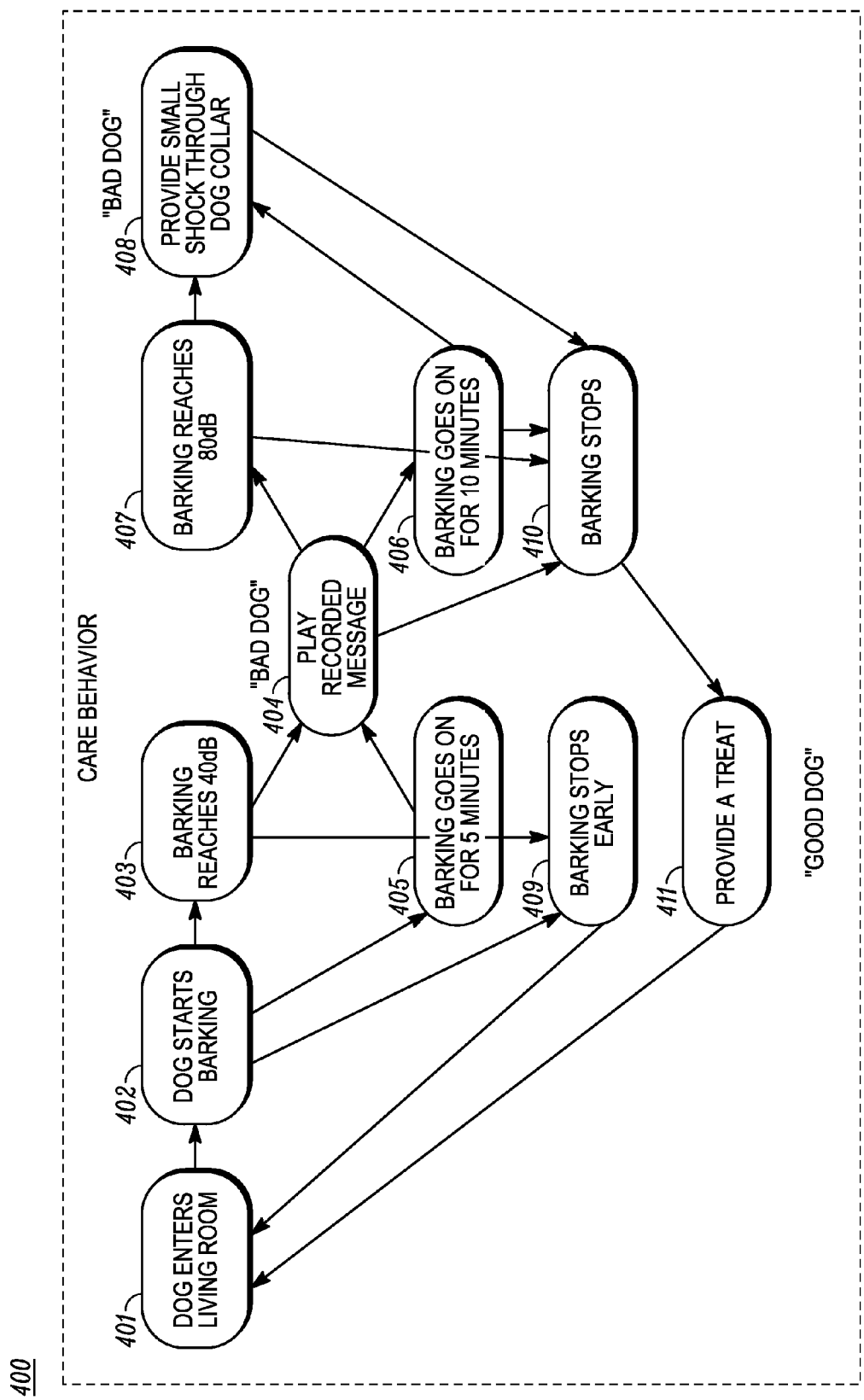
FIG. 4A illustrates a first example state chart, according to one embodiment.

FIG. 4A illustrates an example state chart, according to one embodiment. State chart 400 depicts actions by a pet and the computerized responses to the pets actions, based on the pet owner's requirements. Specifically, State chart 400 describes the case of Pet owner "John" and his pet dog "Mate" (which may be represented as pet 202 of FIG. 2 or physical entity 302 of FIG. 3) as follows: John is preparing to leave for a weekend getaway and decides to leave his dog, Mate, at home. John knows that Mate, often has a tendency to be very energetic around the empty house, potentially causing self-inflicted harm or damaging the house/furniture. Thus, John wishes to make sure that the dog behaves appropriately while John is away. In order to prevent damage to the house or harm to Mate, John decides to implement a set of rules that are to be reinforced based on a specific set or subset of actions by the dog during the weekend. These rules may be enforced using a virtual entity representation of John (e.g., avatar 132).

RMV utility 110 provides a login for John to PetAnalysis tool/application 114 (user interface further illustrated in FIGS. 5 and 6) which holds information and analyses of Mate's past actions and rules/regulations that John has used to reward or punish such actions. John wishes to prevent Mate from barking excessively inside the living room. However, Mate may bark freely in any other room. Thus, RMV utility 110 allows John to create a rule that monitors Mate and tracks a sequence of actions to determine when Mate (1) enters the living room, as illustrated by state 401, (2) starts barking (e.g., state 402), (3) continues to bark at specific decibel level (e.g., state 403), and/or (4) continues to bark for more than 5 minutes (e.g., state 405).

Monitoring devices 303 sense the dog's actions and forwards information about the detected action(s) to action transmitter 305. Action transmitter 305 compiles an XML file that includes information pertaining to the detected action(s). Action transmitter 305 forwards an XML file to interpret server 100. RMV utility 110 detects receipt of the information about the dog's actions at Interpret server 100. RMV utility determines whether the sequence of actions described by state 401, state 402, state 403 and/or state 405 occurs. RMV utility 110 also determines the appropriate response. If RMV utility 110 determines that such a sequence of actions occurs, RMV utility 110 triggers John's pre-recorded voice from a device in the dog's collar to instruct Mate to be quiet (e.g., state 404), according to the pre-defined rules and relations data.

In particular, rules engine 318 obtains rules and relations data corresponding to pet 202, from database 109. Rules engine 318 examines the rules and relation data to determine which set of rules apply to the current behavior pattern (i.e., the sequence of actions). Rules engine 318 forwards the entity id and the selected rules and relations to rules translator 317. Rules translator 317 determines the potential set of responding actions (i.e., the potential response by virtual entity 132 based on the selected rules and statistical information. Rules translator 317 sends the potential set of responding actions and the user id of virtual entity 132 to action transmitted translator 319.

Action transmitted translator 319 selects the best action(s) and creates XML file 111 integrated with the action information for the virtual entity based on the rules and the location of the virtual entity. According to the example, the selected action is to trigger John's pre-recorded sound from a device in the dog's collar to instruct the dog to be quiet In addition, action transmitted translator 319 sends XML file 111 to action enforcer 331. Action enforcer 331 translates XML file 111 to receive information about the action to be performed and forwards information of the selected action to action enabler 329. Action enabler 329 sends a request to (virtual entity) avatar 132 to perform the selected action. Virtual entity/avatar 132 (i.e., the responding entity) performs the selected action response.

If RMV utility 110 receives an indication that the dog stops barking (e.g., state 410), RMV utility 110 automatically triggers the dispensing of a doggy treat via the electronically controlled food tray (located in few places), as illustrated by state 411, according to the pre-defined rules and relations data. If RMV utility 110 receives an indication that Mate continues to bark for 10 minutes (e.g., state 406) and/or continues to bark at an even higher pre-determined decibel level (e.g., state 407), RMV utility 110 triggers the emission of a small shock via Mate's collar which may be wirelessly connected to DPS 225, as illustrated by state 408, in order to control the dog. If RMV utility 110 receives an indication that Mate stops barking after the shock, RMV utility 110 automatically triggers the dispensing of the doggy treat.

In order to avoid Mate's self-inflicted injuries, John also wishes to ensure that the dog does not run excessively though the house. To control excessive running John may create a rule that states that if the dog runs for 2 minutes (State W) the collar emits Johns pre-recorded voice telling Mate to stop running (State X). If RMV utility 110 receives an indication that Mate continues to run for five (5) minutes (State Y), RMV utility 110 may turn on the television closest to Mate and a pre-recorded video of John may appear to instruct Mate to stop running (State Z). If RMV utility 110 receives and indication that Mate stops running within the 2 minute interval or between the 2 and 5 minute interval, RMV utility 110 may trigger his food tray to automatically dispense doggy treat to reward him for following rules (State V).

John may also wish to setup a rule that ensures that the door unlocks and opens to allow the dog to go outside in the case of an emergency such as a fire, detected carbon monoxide presence or other pre-defined or pre-programmed reasons. Thus, if fire detectors detect fire, RMV utility 110 may transmit the alarm incident to database 109. In addition, RMV utility 110 may trigger a play of John's pre-recorded voice/message over collar/house speakers 203 to instruct Mate to go outside.

Figure 4B:
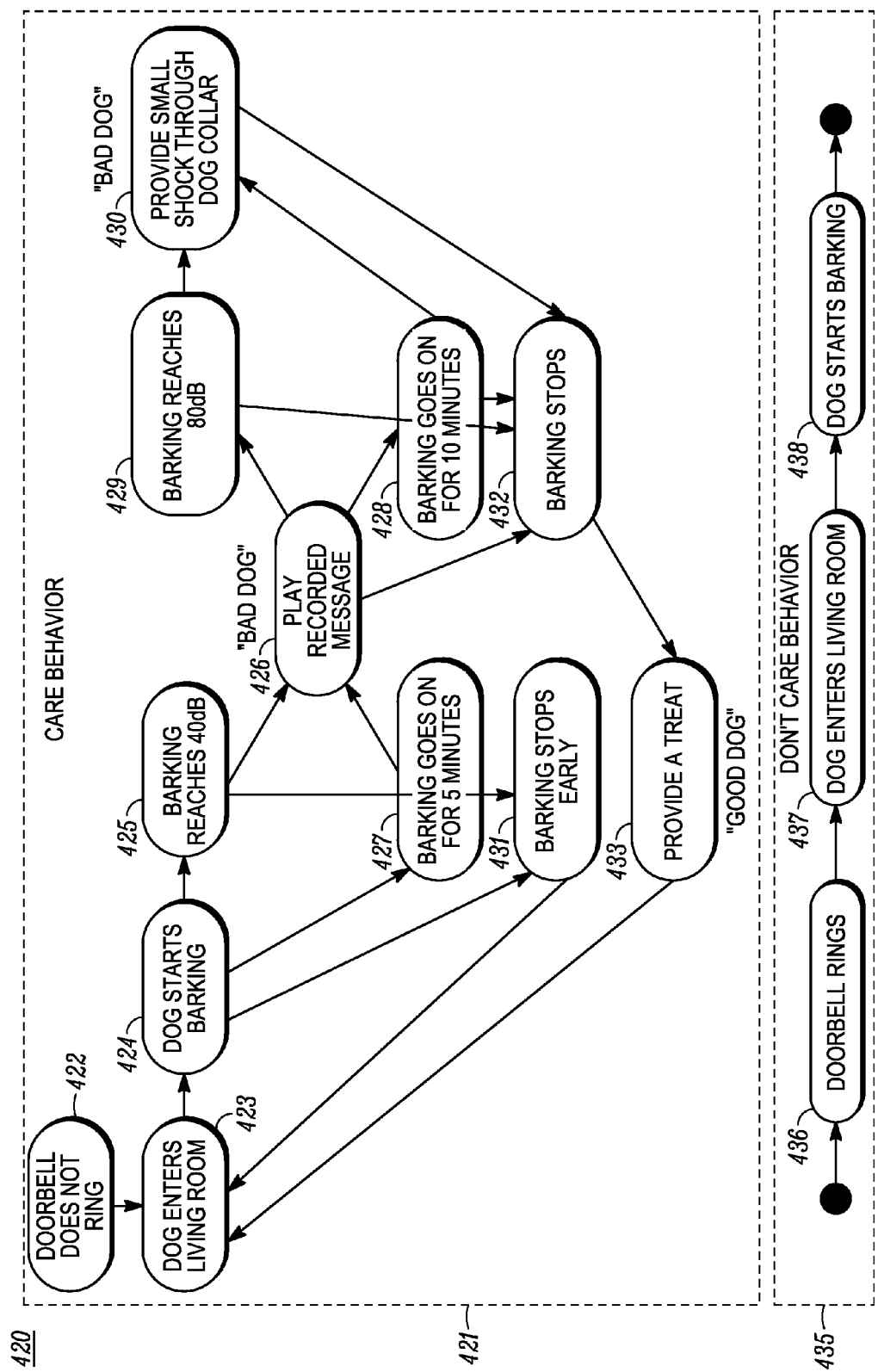
FIG. 4B illustrates a second example state chart, according to one embodiment.

FIG. 4B illustrates an example two-part state chart, according to one embodiment. State charts 420 depict a modification to the rules of state chart 400 based on observations by the pet owner. State charts 420 comprise "care behavior" chart 421 and "don't care behavior" chart 435. Referring again to the John and Mate example, after a few days, John decides to review his dog's behavior patterns. RMV utility 110 provides a login for John to the PetAnalysis website application. In addition, RMV utility 110 allows John to examine Mate's actions and the rewards/punishments provided up to that point. John notices that there are 10 punishments due to excessive barking. As a result, John decides to examine/inspect the analysis provided by the application 114/RMV utility 110 of the sequence of events that causes Mate to bark and to find out if there were any common events that causes Mate to bark every time. RMV utility 110 is able to identify and provide up to 10 minutes worth of data recorded before the dog started barking. PetAnalysis shows that 30 seconds before the dog starts to run, the doorbell is triggered, in all 10 cases. John decides to adapt his rules algorithm to trigger punishment for barking in the living room only if the doorbell is not triggered, as illustrated by state 422. Thus, John allows the dog to bark in the living room for a longer preset amount of time if the doorbell is triggered, as illustrated by chart 435.

When John returns home, he logs into PetAnalysis to examine Mate's actions in order to know what his pet has done and if he (i.e., John) should create any new rules. If, for example, the log shows that the dog drinks toilet bowl water after eating, RMV utility 110 allows John to create a rule stating that if the dog is home alone and starts eating, all bathroom doors close to prevent the dog from getting into the toilet to drink toilet water. Thus, RVM utility 110 enables John to prevent Mate from drinking toilet bowl water after eating.

In one embodiment, RMV utility 110 allows John to create a virtual pet, Max. However, initially Max does not do or behave anything like Mate, John's physical world pet. John would like his virtual pet to behave in a manner similar to his physical world pet. RMV utility 110 allows John to create Max based on Mate's behavior patterns, the corresponding rules and relations data and the list of potential action responses. The process of developing a virtual pet/entity by using information about the characteristics of a real pet/entity is further described using the flow chart of FIG. 8, described later herein.

Figure 5:
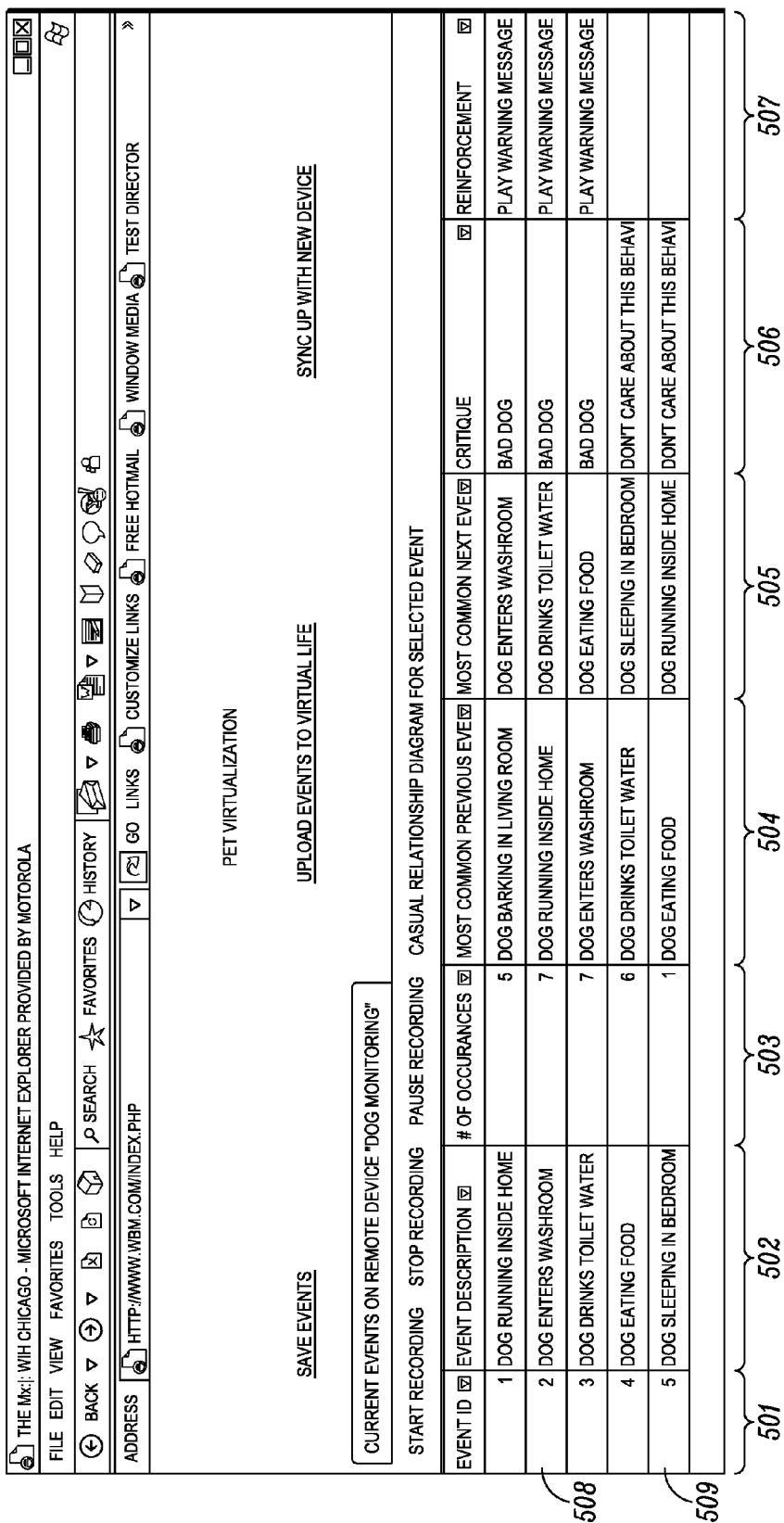
FIG. 5 illustrates an example display of the graphical user interface (GUI) of a virtualization application indicating an event history list, according to one embodiment.

FIG. 5 illustrates an example display of the graphical user interface (GUI) of a virtualization application indicating an event history list, according to one embodiment. GUI 500 comprises "event ID" column 501, "event description" column 502 and "# of occurrences" column 503. In addition, GUI 500 comprises "most common previous event" column 504, "most common next event" column 505 and "critique" column 506. Also included in GUI 500 is "reinforcement" column 507. GUI 500 also includes several example behavior patterns of which first behavior pattern 508 and second behavior pattern 509, are specifically referenced/identified as examples.

According to first behavior pattern 508, RMV utility 110 uses the event label "Dog enters washroom" to refer to the occurrences of the dog entering the washroom, as illustrated within "event description" column 502. According to "event ID" column 501, "Dog enters washroom" has the corresponding event ID of "2". RMV utility 110 receives feedback by which RVM utility determines and indicates that the dog has entered the washroom seven (7) times during the tracking period, according to "# of occurrences" column 503. RMV utility 110 automatically updates the number of event occurrences each time the event is detected. RMV utility 110 indicates via "most common previous event" column 504 that, historically, the event that most frequently precedes the occurrences of the dog entering the washroom is the event labeled as "Dog running inside home". In addition, RMV utility 110 indicates via "most common next event" column 505 that, historically, the event that most frequently follows the occurrences of the dog entering the washroom is the event labeled as "Dog drinks toilet water". RMV utility 110 indicates that the event "Dog enters washroom" (as well as the event "Dog drinks toilet water") is undesired by the "bad dog" label provided via "critique" column 506, according to a set of previously specified rules. RMV utility 110 initiates play of a warning message, which is transmitted to speakers 203, as a corresponding "reinforcement".

However, according to second behavior pattern 509, RMV utility 110 indicates that the event "Dog sleeping in bedroom" is an approved event. RMV utility 110 indicates approval of this event by the "don't care about this behavior" label provided via "critique" column 506. RMV utility 110 uses no "reinforcement" for the event labeled as "Dog sleeping in bedroom".

Figure 6:
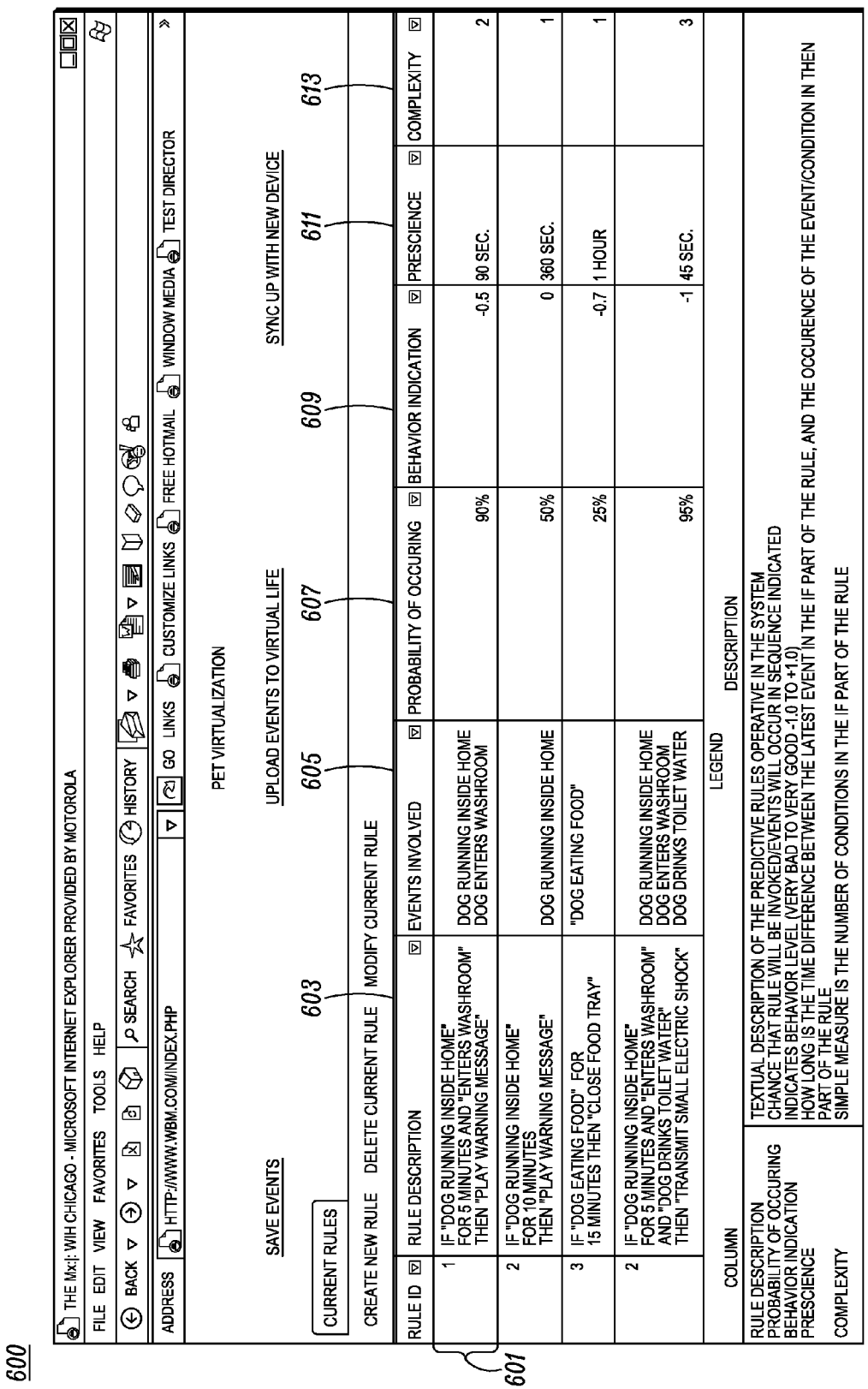
FIG. 6 illustrates an example display of a virtualization application indicating the rules that pertain to particular behavior patterns and the corresponding statistical data, according to one embodiment.

FIG. 6 illustrates an example display of the graphical user interface (GUI) of a virtualization application, indicating the rules that pertain to particular behavior patterns and the corresponding statistical data, according to one embodiment. GUI 600 comprises several rules pertaining to the pet's behavior pattern of which rule-relation 601 is specifically referenced/identified as an example for the purposes of a description of the illustrated embodiment. According to rule-relation 601, RMV utility 110 indicates that rule "1" is executed and described within "rule description" column 603 as follows: "IF 'Dog running inside home' For 5 minutes and 'enters washroom' THEN 'play warning message'". Rule-relation 601 indicates that the described rule is based on two specific actions of the dog (i.e., events based on the dog's activities), as illustrated within "events involved" column 605. In particular, these events are listed in sequence as follows: (1) "Dog running inside home"; and (2) "Dog enters washroom". Thus, the rule has a complexity of "2", based on the number of events, as illustrated within "complexity" column 613. RMV utility 110 indicates that the probability that the events of rule "1" occur in the sequence described is 90%, as illustrated within "probability of occurring" column 607. RMV utility 110 dynamically determines and indicates that the corresponding behavior level of the sequence of events is "−0.5" on a scale of −1.0 (very bad) to +1.0 (very good), as illustrated within "behavior indication" column 609. RMV utility 110 uses the "prescience" label to indicate the maximum allowable time difference between the latest actions in the "IF" section of the rule (e.g., rule 1) and the occurrence of the event/condition in the "THEN" section of the rule. For rule-relation 601, RMV utility 110 indicates that the "prescience" is 90 seconds, as illustrated within "prescience" column 611. Thus, for example, RMV utility 110 may allow a maximum of 90 seconds to elapse between the time that the dog enters the washroom and the time that the warning message begins playing.

Figure 7:
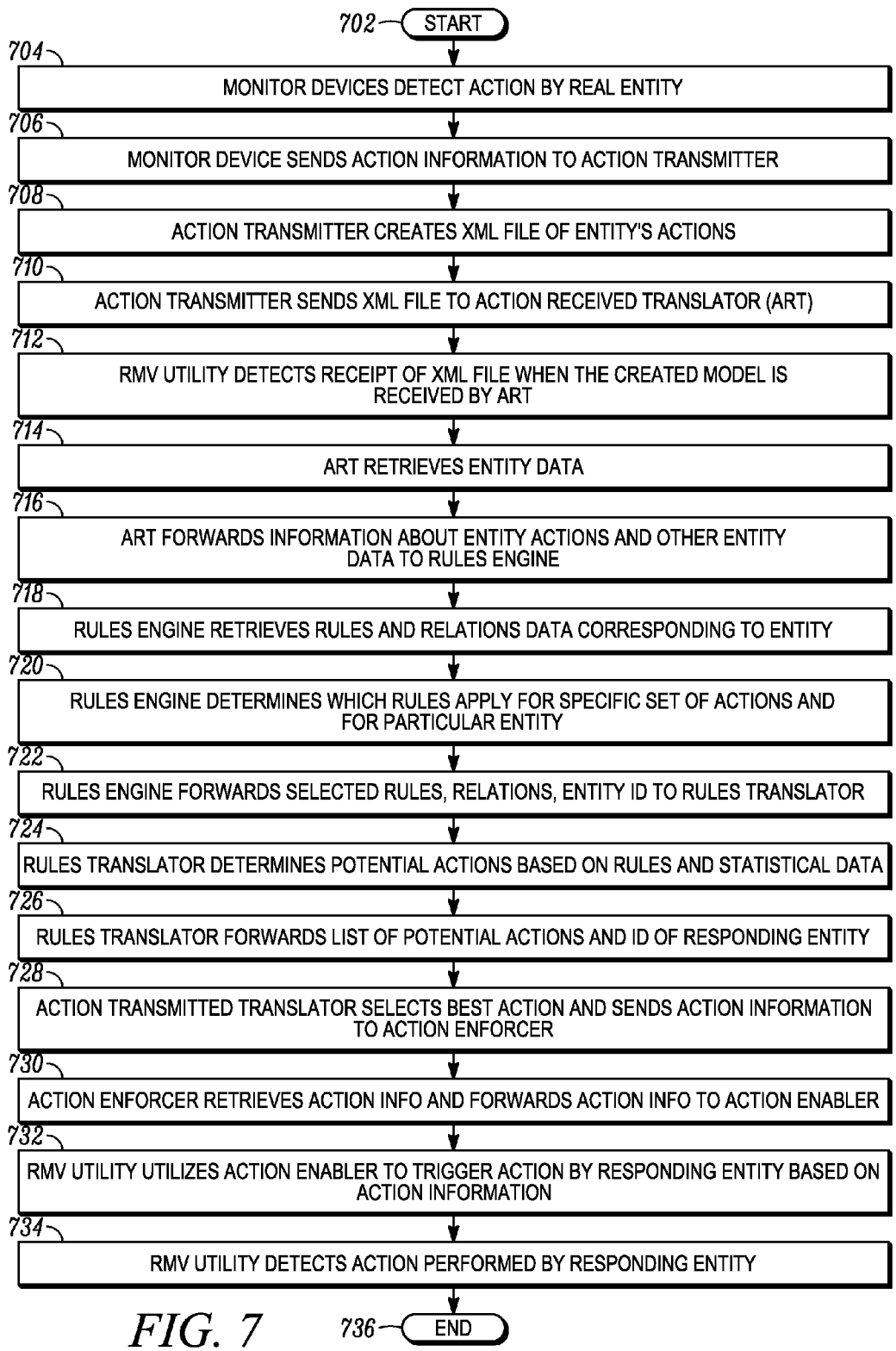
FIG. 7 is a flow chart illustrating the process of providing interactions between a real entity and a virtual entity, according to one embodiment.

FIG. 7 is a flow chart illustrating the method by which the above process of the illustrative embodiments is completed. In particular, FIG. 7 illustrates the process of providing interactions between a real entity and a virtual entity. Although the method illustrated in FIG. 7 may be described with reference to components shown in FIGS. 1-6, it should be understood that this is merely for convenience and alternative components and/or configurations thereof can be employed when implementing the various methods. Key portions of the methods may be completed by RMV utility 110 and associated virtualization application/system executing on processor 101 within DPS 100 (FIG. 1) and controlling specific operations of/on DPS 100, and the methods are thus described from the perspective of either/both RMV utility 110 and DPS 100.

The process of FIG. 7 begins at initiator block 702 and proceeds to block 704, at which monitoring devices 303 detect that one or more pre-defined actions are performed by physical/real entity 202. Monitoring device 303 sends information pertaining to the occurrence of the action to action transmitter 305, as shown at block 706. At block 708, action transmitter 305 compiles an XML file that includes information pertaining to the detected action(s). Action transmitter 305 forwards the compiled XML file to interpret server 100 and, in particular, to action received translator 320, as shown at block 710. RMV utility 110 detects receipt of the compiled XML file when the XML file is received by action received translator 320, as shown at block 712. At block 714, action received translator 320 retrieves from the XML file the action data and corresponding identification (ID) of the entity (i.e., ID of physical entity 202). In addition, action received translator 320 obtains further data corresponding to pet 202, from database 109. For example, action received translator 320 may obtain historical actions/events data and statistical data from database 109. At block 716, action received translator 320 forwards data corresponding to pet 202 to rules engine 318. In addition, rules engine 318 obtains rules and relations data corresponding to physical entity 202, from database 109 (via action received translator 320), as shown at block 718. At block 720, rules engine 318 examines the rules and relation data to determine which set of rules apply to the current behavior pattern (i.e., behavior pattern based on actions that may include past, present and likely future actions). At block 722, rules engine 318 forwards the entity ID and the selected rules and relations to rules translator 317. Rules translator 317 determines the potential set of responding actions (i.e., the potential response by virtual entity/avatar 132) based on the selected rules and statistical information, as shown at block 724. At block 726, rules translator 317 sends the potential set of responding actions and the user ID of virtual entity/avatar 132 to action transmitted translator 319.

At block 728, action transmitted translator 319 selects the best action(s) and creates XML file 111 integrated with the action information for the virtual entity based on the rules and the location of the virtual entity. In addition, action transmitted translator 319 sends XML file 111 to action enforcer 331. At block 730, action enforcer 331 translates XML file 111 to receive information about the action to be performed and forwards information of the selected action to action enabler 329. Action enabler 329 sends instructions to virtual entity/avatar 132 to perform the selected action, as shown at block 732. At block 734, virtual entity/avatar 132 (i.e., the responding entity) performs the selected action. The process ends at block 736.

Figure 8:
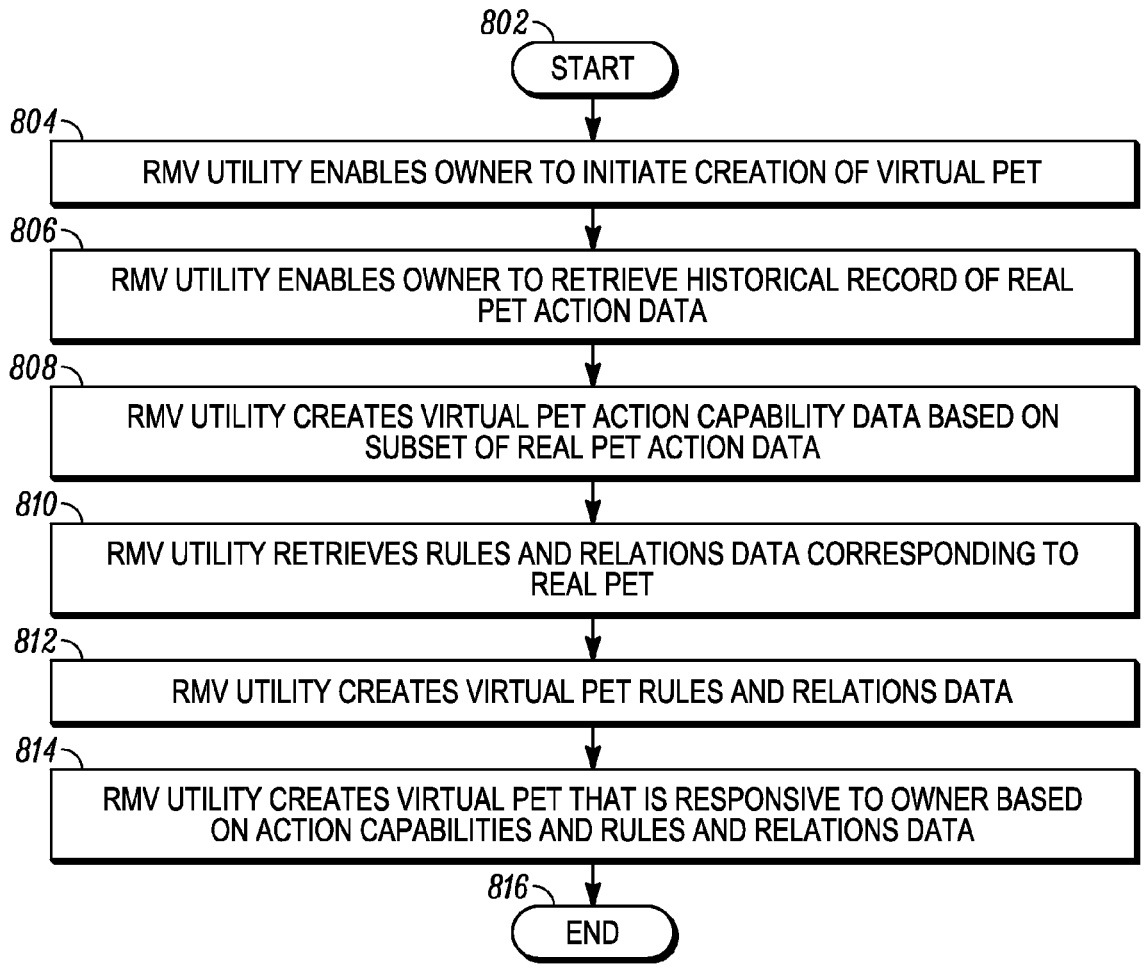
FIG. 8 is a flow chart illustrating the process of developing a virtual entity by using information about the characteristics of a real entity, according to one embodiment.

FIG. 8 is a flow chart illustrating the method by which the above process of the illustrative embodiments is completed. In particular, FIG. 8 illustrates the process of developing a virtual entity by using information about the characteristics of a real entity. Although the method illustrated in FIG. 8 may be described with reference to components shown in FIGS. 1-6, it should be understood that this is merely for convenience and alternative components and/or configurations thereof can be employed when implementing the various methods. Key portions of the methods may be completed by RMV utility 110 and associated virtualization application/system executing on processor 101 within DPS 100 (FIG. 1) and controlling specific operations of/on DPS 100, and the methods are thus described from the perspective of either/both RMV utility 110 and DPS 100.

The process of FIG. 8 begins at initiator block 802 and proceeds to block 804, at which RMV utility 110 allows a pet owner to initiate the creation of virtual pet. RMV utility 110 allows the pet owner to retrieve a historical record of the action data for a real pet that the virtual pet is being created to resemble, as shown at block 806. At block 808, RMV utility 110 creates the virtual pet action/capability data based on a subset of real pet action data. RMV utility 110 retrieves the rules and relations data corresponding to the real pet, as shown at block 810. RMV utility 110 develops the virtual pet rules and relations data, as shown at block 812. At block 814, RMV utility 110 creates the virtual pet that is responsive to a pre-determined set of owner actions based on the action/capabilities and rules and relations data for the virtual entity. The process ends at block 816.

The illustrated and described embodiments provide, in a data processing system, a method, a system and a mechanism that enables a receiver receiving/collecting information about a first behavior pattern of a first entity that exists in the real world. The processor executes the RMV logic/utility to initiate creation of a model of the first behavior pattern of the first entity. According to a pre-defined set of rules, relations and conditions, the RMV logic maps one or more first characteristics of the first behavior pattern of the first entity to one or more second characteristics of a second behavior pattern of a second entity, that exists in a virtual world, by using the model created. The RMV logic identifies potential behavior patterns for the second entity by using the mapped first and second characteristics. The RMV logic selects a current behavior pattern from among the potential behavior patterns of the second entity based on the rules and the location of the virtual entity. In addition, the RMV logic triggers an optimized response by the second entity based on the current behavior pattern selected. In one embodiment, the RMV logic develops a virtual entity representation of the first/real entity based on the behavior model. The RMV logic uses a previously created model for a corresponding physical entity in the real world to create the second entity that exists in the virtual world.

In the flow charts above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional wireless communication system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method comprising:
   a receiver receiving information about a first behavior pattern comprising actions/activities of a first entity that exists in a real world;
   a processor creating a model of the first behavior pattern based on actions/activities of the first entity via execution of an event sequence analysis and adaptation engine;
   mapping, by using the model created, one or more first characteristics of the first behavior pattern of the first entity in the real world to one or more second characteristics of a second behavior pattern of a second entity that exists in a virtual world, according to a pre-defined set of rules, relations and conditions;
   identifying potential behavior patterns for the second entity by using the mapped first and second characteristics;
   selecting a current behavior pattern from among the potential behavior patterns of the second entity based on the mapped first and second characteristics; and
   triggering an optimized response by the second entity based on the current behavior pattern selected.

2. The method of claim 1, wherein said collecting further comprises:
   recording information about characteristics of the first entity and a corresponding environment of the first entity via one or more monitoring devices;
   wherein said one or more monitoring devices are placed at one or more of: (a) a location at which said monitoring device is attached to the first entity; and (b) a fixed location within the surrounding environment of the first entity;

wherein said one or more monitoring devices identifies (a) an occurrence of one or more of a pre-specified set of events by using pre-defined thresholds; and (b) an existence of one or more of a pre-specified set of conditions by using pre-defined event rules; and wherein said one or more monitoring devices forwards information about the identified events and conditions to an event sequence analysis and adaptation engine in order to determine an appropriate response by the second entity.

3. The method of claim 1, wherein said selecting further comprises:

determining one or more of: (a) a local response, according to a pre-specified set of local action rules and identified conditions; and (b) a global response, according to a pre-specified set of global action rules and identified events and conditions; and wherein said local response provides interaction directly with the first entity;

wherein said global response provides interaction directly with the surrounding environment.

4. The method of claim 1, wherein said creating further comprises:

creating behavior models that represent a pre-determined level of statistical correlation between set of events and conditions by using causal analysis techniques; and developing said behavior models by using machine learning or incremental learning techniques;

wherein said behavior models predict probable future behavior patterns.

5. The method of claim 1, wherein said mapping further comprises:

identifying a first set of characteristics of the first entity that triggers a response by a second entity;

selecting the second entity to provide a response, according to one or more of: (a) a set of priority rules; and (b) characteristics of the second entity;

choosing characteristics of the second entity that the second entity utilizes in order to provide a response to the first entity; and determining the mechanisms that are utilized to enable the second entity to provide the response, according to the characteristics chosen.

6. The method of claim 1, further comprising:

developing a virtual entity representation of the real entity based on the behavior models; and creating said second entity that exists in the virtual world from one or more behavior models for a corresponding physical entity in the real world.

7. The method of claim 1, further comprising:

providing a graphical user interface (GUI) having one or more of: (a) an event history list; and (b) conditions corresponding to an event history and a pre-specified set of event rules; and displaying preset, pre-defined labels for events and conditions recorded in a historical database, wherein said labels provide a representative scoring scale.

8. A data processing system comprising:

a memory;

one or more processors coupled to the memory;

a utility which executes on the one or more processors to provide the functions of: collecting information about a first behavior pattern comprising actions/activities of a first entity that exists in the real world;

creating a model of the first behavior pattern based on the actions/activities of the first entity;

mapping, by using the model created, one or more first characteristics of the first behavior pattern of the first entity in the real world to one or more second characteristics of a second behavior pattern of a second entity that exists in a virtual world, according to a pre-defined set of rules, relations and conditions;

identifying potential behavior patterns for the second entity by using the mapped first and second characteristics;

selecting a current behavior pattern from among the potential behavior patterns of the second entity based on the mapped first and second characteristics; and triggering an optimized response by the second entity based on the current behavior pattern selected.

9. The data processing system of claim 8, wherein said functions for collecting further comprises functions for:

recording information about characteristics of the first entity and a corresponding environment of the first entity via a monitoring device;

wherein said monitoring device is placed at one or more of: (a) a location at which said monitoring device is attached to the first entity; and (b) a fixed location within the surrounding environment of the first entity;

wherein said monitoring device identifies (a) an occurrence of one or more of a pre-specified set of events by using a pre-defined set of thresholds; and (b) an existence of one or more of a pre-specified set of conditions by using a pre-defined set of event rules; and wherein said monitoring device sends information about the identified events and conditions to an event sequence analysis and adaptation engine in order to determine an appropriate response by the second entity.

10. The data processing system of claim 8, wherein said functions for selecting further comprises functions for:

determining one or more of: (a) a local response, according to a pre-specified set of local action rules and identified conditions; and (b) a global response, according to a pre-specified set of global action rules and identified events and conditions; and wherein said local response provides interaction directly with the first entity;

wherein said global response provides interaction directly with the surrounding environment.

11. The data processing system of claim 8, wherein said functions for creating further comprises functions for:

creating behavior models that represent a pre-determined level of statistical correlation between set of events and conditions by using causal analysis techniques; and developing said behavior models by using one or more of machine learning and incremental learning techniques;

wherein said behavior models predict probable future behavior patterns.

12. The data processing system of claim 8, wherein said functions for mapping further comprises functions for:

identifying a first set of characteristics of the first entity that triggers a response by a second entity;

selecting the second entity to provide a response, according to one or more of: (a) a set of priority rules; and (b) characteristics of the second entity;

choosing a characteristics of the second entity that the second entity utilizes in order to provide a response to the first entity; and determining the mechanisms that are utilized to enable the second entity to provide the response, according to the characteristics chosen.

13. The data processing system of claim 8, said utility further comprising functions for:
  developing a virtual entity representation of the real entity based on the behavior models; and
  creating said second entity that exists in the virtual world from a previously created set of behavior models for a corresponding physical entity in the real world.

14. The data processing system of claim 8, further comprising:
  a display providing a graphical user interface (GUI) having one or more of: (a) an event history list; and (b) conditions corresponding to an event history and a pre-specified set of event rules; and
  wherein said utility further comprising functions for enabling a display within the GUI of preset, pre-defined labels for events and conditions recorded in a historical database, wherein said labels provide a representative scoring scale.

15. In a data processing system having a processor, a method performed by the processor execution of one more utilities, the method comprising:
  collecting information about a first behavior pattern comprising actions/activities of a first entity that exists in the real world;
  creating one or more behavior models of the first behavior pattern based on the actions/activities of the first entity;
  developing a virtual entity representation of the real entity based on the behavior models;
  creating said virtual entity as a second entity that exists in a virtual world, wherein said virtual entity is created from the one or more behavior models;
  mapping, by using the model created, one or more first characteristics of the first behavior pattern of the first entity in the real world to one or more second characteristics of a second behavior pattern of the second entity that exists in the virtual world, according to a pre-defined set of rules, relations and conditions;
  identifying potential behavior patterns for the second entity by using the mapped first and second characteristics;
  selecting a current behavior pattern from among the potential behavior patterns of the second entity based on the mapped first and second characteristics; and
  triggering an optimized response by the second entity based on the current behavior pattern selected.

16. The method of claim 15, wherein said collecting further comprises:
  recording information about characteristics of the first entity and a corresponding environment of the first entity via one or more monitoring devices;
  wherein said one or more monitoring devices are placed at one or more of: (a) a location at which said monitoring device is attached to the first entity; and (b) a fixed location within the surrounding environment of the first entity;
  wherein said one or more monitoring devices identifies (a) an occurrence of one or more of a pre-specified set of events by using pre-defined thresholds; and (b) an existence of one or more of a pre-specified set of conditions by using pre-defined event rules; and
  wherein said one or more monitoring devices forwards information about the identified events and conditions to an event sequence analysis and adaptation engine in order to determine an appropriate response by the second entity.

17. The method of claim 15, wherein said selecting further comprises:
  determining one or more of: (a) a local response, according to a pre-specified set of local action rules and identified conditions; and (b) a global response, according to a pre-specified set of global action rules and identified events and conditions; and
  wherein said local response provides interaction directly with the first entity;
  wherein said global response provides interaction directly with the surrounding environment.

18. The method of claim 15, wherein said creating further comprises:
  creating behavior models that represent a pre-determined level of statistical correlation between set of events and conditions by using causal analysis techniques; and
  developing said behavior models by using machine learning or incremental learning techniques;
  wherein said behavior models predict probable future behavior patterns.

19. The method of claim 15, wherein said mapping further comprises:
  identifying a first set of characteristics of the first entity that triggers a response by a second entity;
  selecting the second entity to provide a response, according to one or more of: (a) a set of priority rules; and (b) characteristics of the second entity;
  choosing characteristics of the second entity that the second entity utilizes in order to provide a response to the first entity; and
  determining the mechanisms that are utilized to enable the second entity to provide the response, according to the characteristics chosen.

* * * * *